March 4, 1969
JAMES E. WEBB
ADMINISTRATOR OF THE NATIONAL AERONAUTICS
AND SPACE ADMINISTRATION
DEVICE FOR HANDLING HEAVY LOADS
Filed Nov. 9, 1966
3,430,909
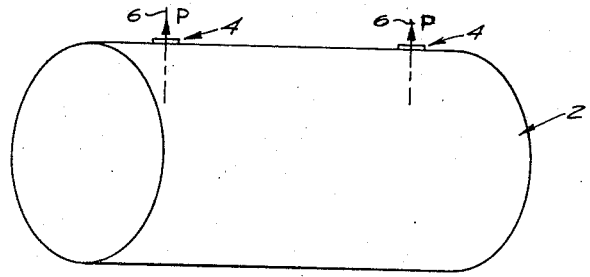
FIG. 1
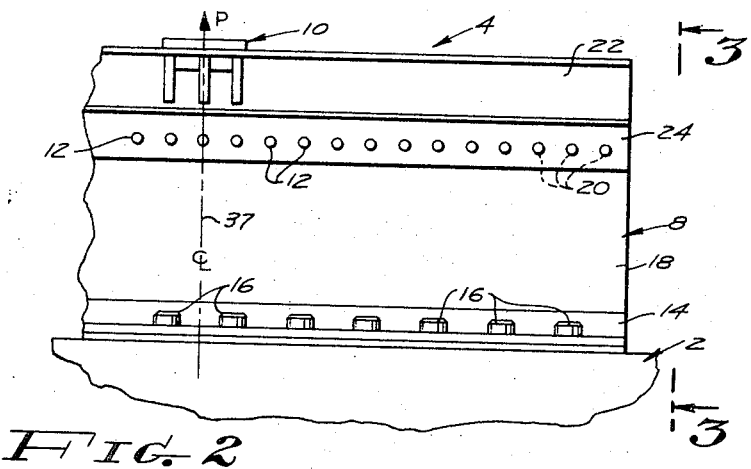
FIG. 2
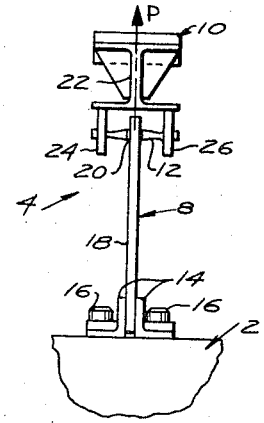
FIG. 3
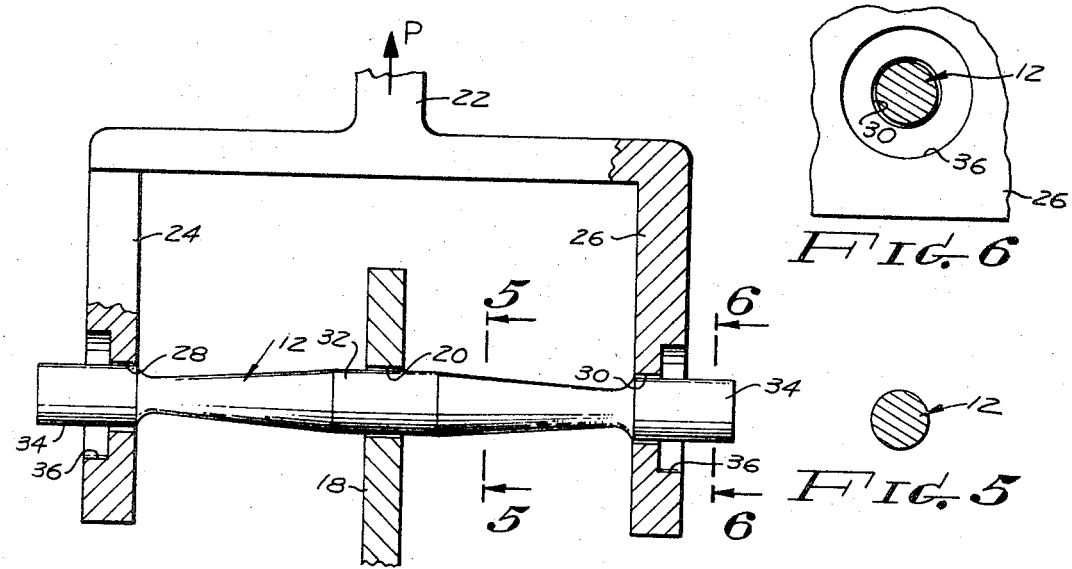
FIG. 4
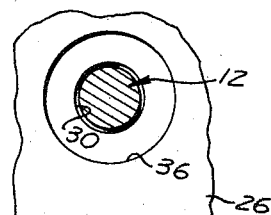
FIG. 6
FIG. 5
INVENTOR.
ROBERT J. MC CANN
BY
Howard B. Scheckman
ATTORNEYS

United States Patent Office 3,430,909
Patented Mar. 4, 1969

3,430,909
DEVICE FOR HANDLING HEAVY LOADS
James E. Webb, Administrator of the National Aeronautics and Space Administration, with respect to an invention of Robert J. McCann, Mountain View, Calif.
Filed Nov. 9, 1966, Ser. No. 593,604
U.S. Cl. 248—317
Int. Cl. F16m 1/00
6 Claims

ABSTRACT OF THE DISCLOSURE

This invention teaches how to distribute a high concentrated force over a large area of an object. It is particularly useful where an object is to be raised and has a relatively thin skin that can be easily damaged by a concentrated force. Essentially a connection, including a frame and a plurality of resilient pins, is provided between the means applying the force and the object. The pins are supported by their ends by the frame, like simple beams. The central portion of each pin is connected to the object. The concentrated force is applied to the frame. The idea is to transmit the concentrated force through the resilient pins so that each pin bends within its elastic limit when a precalculated load on it is reached. Knowing the force to be applied, the pins can be designed to bend under a precalculated load. That is, as a pin bends, adjacent pins pick up the load to thus distribute the concentrated force over a larger area of the object.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to a construction for distributing a concentrated force over a large area. More particularly, it relates to a connection used in lifting heavy objects that distributes the large concentrated lifting force over a relatively large area of the object to be lifted. This is accomplished by utilizing a plurality of members in the connection that are constructed to deflect within their elastic limit and distribute the force.

Background of the invention

One of the problems in handling and lifting a heavy object is the concentrated lifting force applied to the object. For example, assume a crane is to lift an object. Generally, the crane's cable is connected to the eye bolts on the object at one, two, or three support points. The crane then reels in the cable and raises the object. With this type of lifting arrangement, the cable's entire lifting force is concentrated at the one, two, or three support points provided on the object.

Where the object is very heavy or has a thin skin, this lifting force, concentrated at a few points, becomes extremely great. This, in turn, makes it necessary to provide reinforcing structure on the object and at its support points so they can withstand the large lifting force. This additional reinforcing structure, in turn, increases the weight of the object. Where the object to be lifted is, for example, a heavy rocket booster, this additional reinforcing structure weight may be critical to the chances for a successful mission.

Another problem, after a heavy object has been lifted, is that additional shock loads may be imposed on the object during the handling and transporting of the object. For example, many large and heavy booster rockets must be transported from the manufacturing plant to the launch site. This may involve transporting the booster over water, state highways, and on-site roads, thus the booster will be subjected to many different types of shock loads during handling.

This additional shock loading, in turn, makes it necessary to provide even more reinforcing structure on the heavy object so it can withstand these contemplated loads. This additional reinforcing structure also adds to the weight of the object. As mentioned previously, excess weight can be critical in such things as a spacecraft.

With the above problems in mind, it can be seen that if a connection can be provided at each support point that distributes these large concentrated lifting forces over a larger area of the object, this will decrease the per unit stress on the object. That is, assume for example, that a lifting force of 100 pounds is acting on an area of one square inch and is now made to cover an area of ten square inches. The lifting force per square inch would now be one tenth as large or only 10 pounds. This reduced lifting force per unit area will, in turn, permit elimination of the heavy reinforcing structure previously needed.

Thus, one advantage of distributing a force over a large area of an object to be lifted, is that less reinforcing structure will be needed, and the object will weigh less. Another advantage is that the concentrated lifting force per unit area will be smaller and there will be less likelihood of damaging the object.

Summary of the invention

A connection made as taught by this invention, as discussed hereinafter, is capable of distributing a concentrated force over a relatively large area of an object. The above is accomplished, by the present invention, by utilizing a connection that includes a framework containing a plurality of elongated flexible parallel pins that are interposed between the concentrated load or lifting force, and the object. Each pin is supported like a simple beam and designed so that it will flex, within its elastic limit. When a pin is subjected to a load greater than a predetermined amount, it is designed to flex so that adjacent pins pick up the load. Thus, the lifting force will be distributed by the pins over a large area.

In terms of structure, the framework includes an elongated inverted U-shaped support that may be connected to a hoist, such as a crane's lifting cable, for example. A plurality of pins are positioned between the legs of the U-shaped support with the ends of the pins carried by each leg of the U-shaped support. The pins are positioned parallel to each other and in the same plane, like teeth in a comb. The central portion of each pin is adapted to be connected to the object to be lifted. Each pin is made with a thick central portion that decreases in thickness towards its ends. The pins are made of a material that is selected to permit deflection under a predetermined load.

The ends of the pins are thus supported by the legs of the inverted U-shaped support that is connected to the hoist, and their center portion is connected to the object to be lifted, so as to carry the weight of the object. This construction permits each pin to deflect like a simple beam. To further facilitate this deflecting movement, it has been discovered that, if the support-opening receiving each end of the pin is counterbored to provide a minimum bearing area, this will further permit the pin to flex so as to transfer the load to adjacent pins.

As a contrast to the above, if the concentrated lifting force were applied through pins that were rigid, the concentrated lifting force would act directly on the pins under the lifting force. The force would remain concentrated, and would not be transferred to adjacent pins. However, with flexible pins, after the lifting force reaches a predetermined amount, the pins flex and distribute the lifting force to adjacent pins to distribute the lifting force over a large area.

In view of the above, it is therefore an object of this invention to provide a device that will distribute a concentrated force.

It is another object of this invention to provide a material handling connection that can decrease the amount of reinforcing structure needed to protect an object being moved.

Another object of this invention is to provide a connection for handling a heavy object that permits the object to be lighter in weight due to elimination of unnecessary reinforcing structure.

*Brief description of the drawings*

Other objects and advantages will appear from the specifications and claims taken in conjunction with the drawings, wherein:

FIG. 1 is a view of a heavy object being lifted, showing the lifting connection;

FIG. 2 is an enlarged view of the lifting connection of this invention, shown attached to the heavy object;

FIG. 3 is an end view of FIG. 2 taken in the direction of arrows 3—3 showing a pin of the connection;

FIG. 4 is an enlarged view of a portion of FIG. 3 to more clearly show the pin and its support;

FIG. 5 is a sectional view of FIG. 4 taken in the direction of arrows 5—5 showing a cross-section of a pin;

FIG. 6 is a sectional view of FIG. 4 taken in the direction of arrows 6—6 showing the end of a pin received in the enlarged bore of the support member.

*Description of the preferred embodiment*

Referring to the drawings, and more particularly to FIG. 1, there is shown a heavy object that may be a rocket booster 2, for example, that is to be lifted. Booster 2 is shown with two connecting devices 4, 4 attached to its surface. A hoist, such as a crane (not shown) may have its cable 6 attached to connecting device 4 to raise booster 2. It will be apparent that a large concentrated lifting force P will be applied through the cables, due to the heavy weight of the booster now being supported at only two points.

Referring now to FIGS. 2 and 3. There is shown an enlarged view of a connecting device 4 of this invention. It includes supports 8 and 10 that are connected together by pins 12. Support 8 may be connected to the heavy object such as booster 2. It includes flanges 14 that are connected by means in the form of bolts 16 to booster 2. Sufficient bolts 16 are used to make sure that the lifting force P, transferred to booster 2, can be distributed throughout the length of connecting device 4. Flanges 14, in turn, are connected to a load plate 18 that extends vertically and is substantially flat. It has a series of openings 20 equally spaced along its length.

Support 10 is connected to the means that applies the lifting force such as cable 6. Support 10 includes an elongated member 22 that may be an I beam having spaced legs 24, 26 connected thereto. The I beam and legs form an inverted U-shaped channel. The lower portion of legs 24, 26 are positioned to receive plate 18 between them and to overlap the top of plate 18. Referring to FIG. 4, each leg 24 and 26 is also provided with a series of spaced openings 28, 30 that will align with openings 20 in plate 18. Legs 24 and 26 and plate 18 are interconnected by pins 12 that transmit the force from one support to the other support.

Referring to FIG. 4, an enlarged view of a pin 12 is shown. Each pin 12 is essentially an elongated cylinder. Its central portion 32, and ends 34, 34 have a substantially uniform diameter, so that openings 20, 28 and 34 can all be made the same diameter for convenience. Ends 34, 34 are carried within leg openings 28 and 30, and central portion 32 is received in opening 20 of load plate 18. The openings are slightly larger than the pins, to permit one pin to deflect relative to another pin. Pins 12 taper from their central portion 32, toward their ends 34, 34 to provide a tapered portion that permits the pin to more easily deflect under load. While support 10 is shown connected to cables 6 and support 8 is connected to object 2, it is pointed out that the positions of these supports can be reversed if desired.

Referring to FIGS. 4 and 6, it has been discovered that pins 12 will deflect a greater amount under less load, if openings 28 and 30 in leg members 24, 26 are provided with counterbored openings 36. These openings provide a minimum bearing area engaging each end of pin 12.

The following is an example of the load distribution that resulted where a known concentrated lifting force of 30,000 pounds was applied, through the connection of this invention to an object. With a lifting force of 30,000 pounds, supports 8 and 10 were made approximately 10 ft. long. The supports were interconnected by twenty-five pins 12, spaced 5 inches apart, along the length of the supports. Flanges 14, 14 were connected to object 2 by twenty-eight evenly spaced bolts (14 bolts on each side of the plate).

Under the above conditions, tapered pins 12 were made of SAE 4340 steel to satisfy the calculated deflection and strength requirements. Each pin was made 7 inches long, having an outer diameter of .625 inch, tapering to .35 inch at its smallest diameter; legs 24, 26 were .5 inch in thickness and the width of the openings 28, 30 supporting the ends of the pins was .25 inch in length, while plate 18 was made .38 inch in thickness.

First, as background, it is pointed out that if a 30,000 pound force is applied to an eye bolt that has a cross sectional area of one square inch, the lifting force would be 30,000 pounds per square inch. As contrast, with the above setup, and with the 30,000 pound force applied at the center line 37 of load plate 18, it was determined that the load on booster 2 at center line 37 was approximately 1800 pounds per square inch. At about 5 inches from the center line of the lifting force, it was approximately 1750 pounds per square inch; at about 10 inches from the center line the lifting force was approximately 1600 pounds per square inch; at approximately 15 inches from the point of loading, the lifting force was approximately 1400 pounds per square inch, and at approximately 25 inches from the point of load application, the load was approximately 800 pounds per square inch, with the load gradually decreasing away from the center line.

It can be seen, in view of the foregoing, that the 30,000 pound load has been distributed over a large area, and that the load at specific points on the surface of the object has been reduced from a concentrated lifting force of 30,000 pounds to a maximum of 1800 pounds per square inch as the center line. Thus there is no longer any danger of the lifting force damaging the object or booster.

In summary, this invention teaches how to construct a connecting device 4 for handling a heavy object 2 so as to distribute a concentrated lifting force P, over a relatively large area of the object. The connection includes a plurality of tapered pins 12 that are positioned adjacent to each other and supported like simple beams. Each of the pins is designed to deflect within its elastic limits when the force on the pin exceeds a precalculated amount, so as to distribute the concentrated force to adjacent pin members.

As will be apparent to those skilled in the art, the number of lifting connection 4, number of pins 12, as well as the size of supports 8, 10, would depend on the contemplated lifting load, the number of hoists used, and the allowable maximum load it is desired to allow in the object. Additionally, while lifting is illustrated, the connecting structure will operate just as well if an object were pushed through this construction, or if the lifting force were applied parallel to axis of the object to be lifted rather than normal to the axis as illustrated.

It will also be apparent to those skilled in the art that the terms "heavy" or "light" are relative. Where the object or load is "light," even toothpicks could be used for pins 12, if the toothpicks are used so they flex within their elastic limit to transfer the load to adjacent toothpicks, as taught by this invention.

Although but a single embodiment of the present invention has been illustrated and described, it will be apparent to one skilled in the art that various changes and modifications may be made therein without departing from the spirit of the invention.

What is claimed is:

1. In a construction for interconnecting a hoist and a heavy object, the combination comprising:
   a first U-shaper support constructed to be connected to said hoist;
   a second elongated plate-like support constructed to be connected to a large area of said heavy object;
   a plurality of elongated pins, said pins each having ends and a central portion, their ends carried within openings in the legs of said U-shaped support, said plate-like support having openings to receive the central portion of said pins and being positioned between the legs of said U-shaped support, said pins being supported by said supports like simple beams, and, said pins being elastic to deflect within their elastic limit when the force on a pin exceeds a predetermined amount, so as to distribute the load to adjacent pin.

2. A device, as set forth in claim 1, wherein said U-shaped support's openings, that receive said ends of said pins, are counterbored to facilitate deflection of said pins.

3. A device as set forth in claim 1, wherein said pins taper toward their ends to facilitate deflection.

4. A device as set forth in claim 1, wherein said pins are positioned parallel to each other and in the same plane.

5. A device as set forth in claim 1, wherein said pins are cylindrical.

6. A device as set forth in claim 1, wherein said pins are constructed with their central portion having the same diameter as their ends.

References Cited

UNITED STATES PATENTS

| 3,161,162 | 12/1964 | Homolya | 248—317 XR |
| 3,239,958 | 3/1966 | Daum | 248—317 |
| 3,295,801 | 1/1967 | McDowall et al. | 248—18 |

ROY D. FRAZIER, *Primary Examiner.*

V. FRANKLIN FOSS, *Assistant Examiner.*

U.S. Cl. X.R.

214—10.5; 248—18; 294—81